Figure 1:
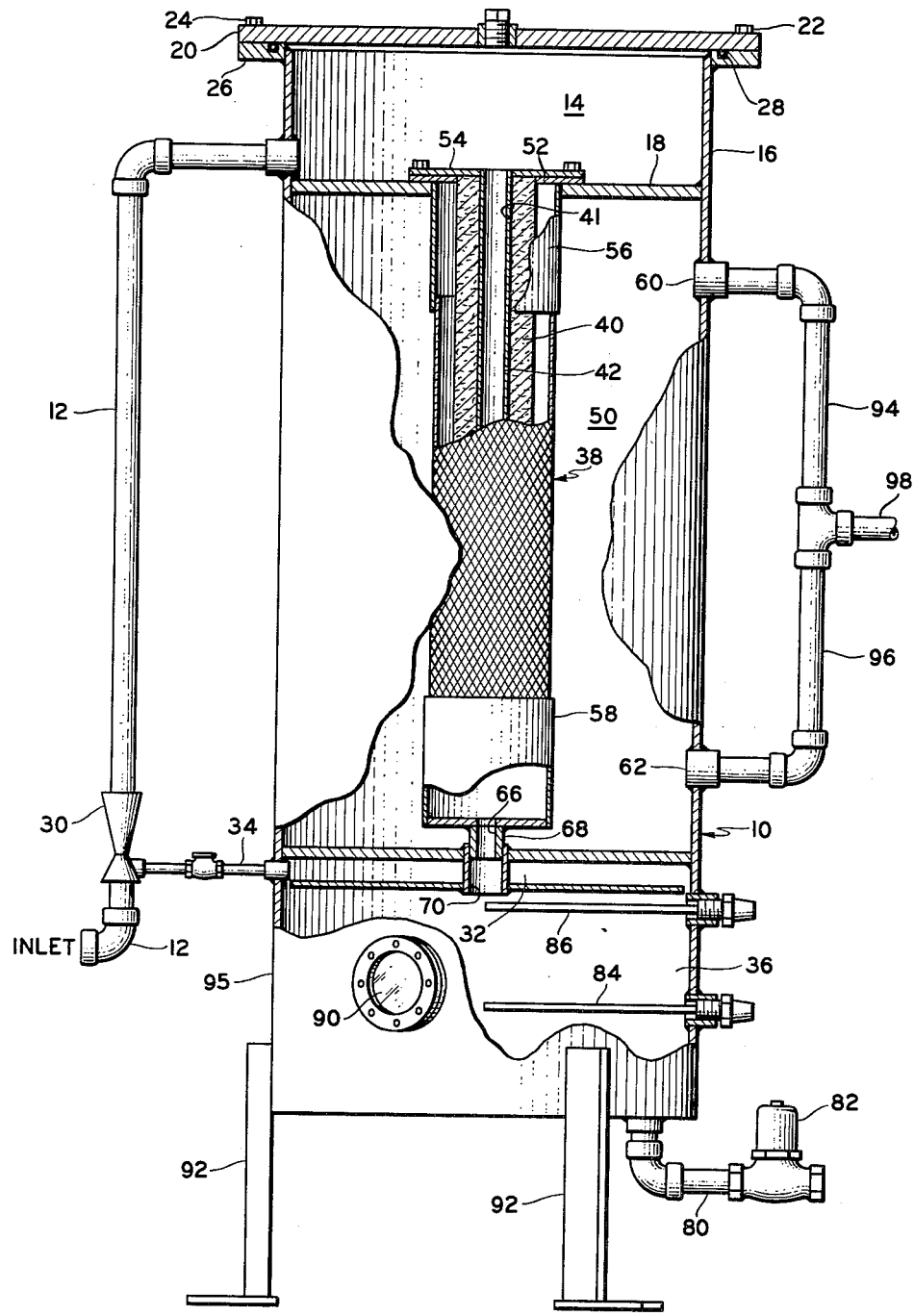

Aug. 10, 1965  C. H. MAY  3,199,676
COALESCING AND FILTERING APPARATUS
Filed Jan. 2, 1962  2 Sheets-Sheet 1

INVENTOR.
CLIFFORD H. MAY
BY Albert L. Jeffers
ATTORNEY

United States Patent Office 3,199,676
Patented Aug. 10, 1965

3,199,676
COALESCING AND FILTERING APPARATUS
Clifford H. May, Fairfax, Va., assignor to The Briggs Filtration Company, Washington, D.C., a corporation of Maryland
Filed Jan. 2, 1962, Ser. No. 163,436
5 Claims. (Cl. 210—114)

This invention relates to a combination filter and separator apparatus, and particularly to one effecting separation of solid phase and liquid phase contaminants from such liquids as turbine lubricating oil or the like.

One of the objects of the present invention is to provide a mechanical filter for removing non-dissolved liquid phase contaminants from fluid such as lubricating oil and the like and also to remove solid phase contaminants, this removal being more efficient in operation than presently used centrifugal purifiers.

Another object of the invention is to provide a mechanical filter which will be capable of breaking down non-dissolved emulsified water impurities and removing such water from lubricating oil and the like by coalescing the water in the oil material and then separating it from the oil so that the filtered oil material can then be circulated for reuse in decontaminated condition.

A further object of the invention is to provide a mechanical filter, which is inherently advantageous over centrifugal type purifiers, by reason of having no moving parts in its construction, it has greater reliability and is less susceptible to mechanical failure. A further advantage of the mechanical filter over the centrifugal purifier is that the oil material can pass through the filter at a substantial variation of rate flow, and reaches quantities of filter flow as high as 500 gallons per hour oil filtration. The referenced rate is not critical but is exemplary of the orders of filtration rate. It is possible to attain even greater speeds of filtration by providing the selected number of parallel connected filters.

A further object of the invention is to provide an arrangement of oil inlet and outlet means which more effectively utilize the entire length of the filter which, in the present invention, is in the form of a cylinder or the like. Regardless however of the shape of the filter it is possible by following the teaching of the present invention to effect more uniform filtration flow throughout the length of the filter by reason of the novel disposition of inlet and outlet means.

A further object of the invention is to provide a novel filter which collects coalesced liquid phase contaminants and discharges such contaminants separately from the filtered flow which leaves the apparatus.

A still further object of the invention is to provide a novel means of creating lube oil circulation from the coalesced water collection chamber back to the inlet side of the filter. Such re-circulation is accomplished by means of a venturi eductor in the inlet line. The object of the re-circulation of a portion of the total flow rate is to assist water fall-out by gravity and further to stabilize lube oil temperatures creating a more uniform viscosity throughout the filter case.

Figure 2:
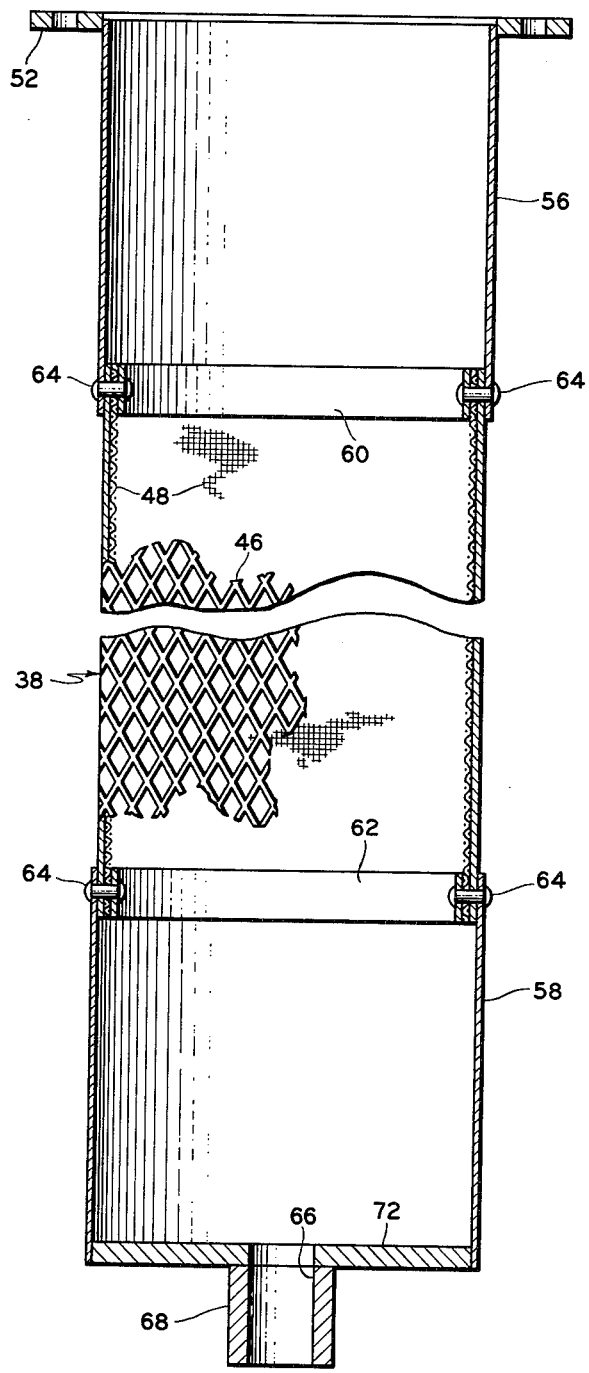

Other objects and features of the invention will become apparent from a consideration of the following description, which proceeds with reference to the accompanying drawings, wherein:

FIGURE 1 is an elevation view of the filter apparatus with a portion thereof broken away to illustrate the interior of the apparatus and having a filter element supported vertically within the effluent chamber, and FIGURE 2 is an enlarged detail view of the filter element canister assembly which surrounds the filter unit proper and is spaced slightly therefrom.

The filter apparatus designated generally by reference numeral 10 includes an inlet line 12 for receiving a flow of contaminated fluid and conducting it to a chamber 14 which is defined by cylindrical casing 16, partition 18 and cover 20. The cover is bolted at 22 and 24 to flange 26 and an O-ring seal 28 may be included to prevent fluid leakage. The incoming fluid in line 12 passes through a jet pump type venturi 30 effecting sub-atmospheric pressure within chamber 32 through line 34 and thereby induce a faster fall rate of discharge rate of contaminant water into the sump chamber 36 and further to create a more uniform temperature in 36. Water which is coalesced by the filter collects within the annular space provided between the inner diameter of canister 38 and the outer surface of filter 40 which is specially treated to be of hydrophilic quality.

The contaminated fluid within chamber 14 enters the centrally located longitudinal passage 41 of filter 40 and as the fluid starts to flow radially outwardly through the filter the solid phase contaminants are trapped and are prevented from passing through the filter. The filter 40 consists typically of a molded fiberglass material, made up in layers or laminations which are concentrically tubular in construction and supported at its inner surface by a center tube 42 which may be copper-silicon or the like and is perforated to allow free passage of fluid radially outwardly through the fiberglass. Generally, a cotton knit tube is then pulled over the outer surface of the fiberglass and the unit as a whole is then supported by end caps having gaskets or the like for sealing against end flow of any fluid which tends to bypass the filter. Details of a suitable filter construction can be found in U.S. Patent No. 2,919,030 which is incorporated herein by reference.

Surrounding the filter 40 but spaced slightly therefrom is a canister 38 (FIG. 2) which is an expanded aluminum tube 46 having a Monel screen 48 typically of about 100 mesh or so, and Teflon coated to provide a hydrophobic surface spaced closely adjacent, in the order of about one inch or so from the outer surface of the filter to define an annular cross-section chamber wherein coalesced fluid is trapped between the outer surface of the filter unit and the concentric closely spaced inner surface of the canister 38 which permits free passage of the filtered fluid outwardly into the effluent chamber 50 but prevents any flow of coalesced liquid phase contaminants therewith. The filter and the canister are supported through flanges 52 and 54, respectively, on partition 18 which suspends the two units vertically within effluent chamber 50.

At the opposite ends of the canister are shields 56 and 58 which prevent passage of fluid radially outwardly from those portions of the filter which are surrounded by the shield and, referring to FIG. 1, these shields are interposed between the filter and each of outlet openings 60 and 62 thereby providing a baffle against passage of coalesced water with the radial flow of filtered fluid and carrying it out through the discharge ports 60, 62. Instead, the coalesced fluid contaminant is drawn downwardly by gravity, supplemented by the vacuum effected by a venturi 30 and producing sub-atmospheric pressure within chamber 32 and sump chamber 36.

Referring to FIG. 2, the baffles 56, 58 may consist of aluminum or the like and the expanded aluminum tube 46 and screen 48 are fastened at their opposite ends to the baffles 56, 58 through aluminum rings 60, 62 with a number of rivets 64. The bottom baffle 58 has a passage opening 66 and an adapter 68 which fits within the bushing 70 (FIG. 1) so that as the water collects between the filter and canister assembly 38 it will drop to the bottom of the canister and collect on end plate 72 and then drain through 66 and bushing 70 into sump chamber 36.

It has been found that by providing two outlets 60, 62 a greater portion of the length of the filter is utilized by fluid passing through the apparatus. Thus, if opening 62 is closed and the bottom portion of the apparatus becomes static, only the upper portion of the filter is utilized, the general direction of radial flow being confined to the upper extremity of the filter so that only a portion of the total length of the filter is functional. Conversely, if opening 60 is closed the upper portion of the filter is substantially unused and is surrounded by static condition fluid and the only radial flow occurs at the lower portion of the filter. Thus, by providing two outlets at 60 and 62 and spaced substantitally the length of the filter, radial flow occurs more uniformly throughout the length of the filter and therefore the filter is used more efficiently and the deposit of filtrate is made more uniform, reducing the pressure drop and obtaining more advantage of the entire length of the filter. The dual outlet lines 60, 62 further provide for a more uniform temperature in the range of approximately 150° F. within the filter case thus causing a uniform viscosity for better water fall-out characteristics.

The fluid which collects within the sump 36 is periodically discharged therefrom through line 80 which is controlled by a solenoid valve 82, the solenoid valve being actuated when two spaced conductors 84, 86 are connected by simultaneous immersion in fluid collecting within sump 36. Thus, the fluid within sump 36 will maintain no less than the level of conductor 84 and will continue to collect therein until it reaches the level of conductor 86 so that when the two conductors 84, 86 are thus connected the solenoid valve 82 is operated to drain the fluid through line 80.

For some applications, I found it desirable to include a sight glass 90 to obtain a view of the interior condition of the sump and to observe water fall-out.

The apparatus as a whole can be supported at whatever vertical elevation is desired by pedestals or the like 92 which may be welded or otherwise suitably secured to the outer casing 95.

In usage, I have employed about five filter units within the apparatus, each of which receives a flow of fluid from inlet chamber 14. The number of filter units depends on the rate and quantity of flow and it is not my intention to be limited by either the number or the size of the filter units.

In operation, a continuous flow of contaminated fluid is supplied through line 12 and is fed within chamber 14, the incoming flow serving to effect through venturi 30 and line 34 a condition of sub-atmospheric pressure within chambers 32, 36 having the purpose of increasing fallout velocity because of the vacuum created within the sump chamber 36. The contaminated fluid in chamber 14 then proceeds to enter longitudinal passages 41 of the filter units 40 where the solid phase contaminants are caught and prevented from passing radially through the fiberglass unit. In practice, I have had considerable success in filtering turbine lubricating oil conforming to MIL–L–17331–B (Texaco Regal Oil 500 E.P.) using about five filter units, each including one wrap of AA fiberglass and two wraps of 5 denier acetate felt wrap covering molded fiberglass tubular members which effect coalescence of non-dissolved water within the interstices of the fiberglass so that as the oil emerges from the filter and passes through a cotton knit tube sleeve covering the filter it will have coalesced into droplets of water of about ¼ inch in diameter.

A filter element having an inside diameter of approximately 1½ inches is adapted to receive a flow rate of approximately 60 gallons per hour and the filter element consisting of a specially molded fiberglass is capable of handling large quantities of solid and is capable also of breaking very low interfacial tension emulsion which will separate water droplets into coalesced form and allow clean turbine oil to pass freely into the effluent chamber 50. Closely surrounding, but spaced slightly from (in the order of 1 inch spacing), is located the canister 38, the internal diameter of which is also approximately 6 inches to mention one specific construction which has been tested. The end of the canister is fluid tightly sealed to the chamber 36 through its adapter 68. The water which collects at the outer surface of the filter is repelled by the closely adjacent hydrophobic surface provided by the Teflon coated 100 mesh Monel screen and which is located at the interior of aluminum tube 46 having diamond shaped openings. This construction of the canister allows free passage of the filtered decontaminated fluid past the canister and into the effluent chamber 50 but confines the separated coalesced liquid phase contaminant causing it to descend by gravity and vacuum action in a downward flow where it collects on end plate 72 and drains through opening 66 into the sump chamber 36. The water which collects within the sump 36 is periodically drained therefrom through the line 80 and the solenoid valve 82 is operated by contacts 84 and 86 which are closed to form a circuit once the water collects to the level immersing both the conductors 84 and 86 and thereby electrically connecting them together. The filter flow of oil passes through the canister into effluent chamber 50 and then exits through outlet openings 60, 62 through branch lines 94, 96 and then enters line 98 where it is returned to the system for reuse.

None of the water which collects at the outer surface of the filter and that is contained between the filter and canister is apt to enter the lines 94, 96 because the outlet ports 60, 62 are shielded from direct radial flow through the filter unit by aluminum baffles 58 and 56 which direct the radial flow in alignment with the outlet ports 60, 62 in a longitudinal direction, thereby insuring a downward flow of the liquid phase contaminant but there is no entrained flow which can carry the coalesced water into the outlet lines 94, 96 to recontaminate the oil.

A beneficial effect of having two outlets 60, 62 is to produce a substantially uniform rate of radial flow throughout the length of the filter thereby making use of a greater portion of the filtering area. Were it not for both outlets 60, 62 there would be a flow confined only to the upper or lower end of the apparatus. Thus if outlet 60 were absent the fluid in the upper portion of the apparatus would be substantially static and no benefit would be had from the upper portion of the filter and conversely if the lower outlet 62 were absent there would be a substantially static condition of liquid at the lower part of the apparatus and no utility would be had from the lower portion of the filter. With the combination of the two outlets however substantially the entire length of the filter is utilized.

In actual practice, it has been found that a filter operating as described has both greater capacity and filtering action than a high-speed centrifuge. Emulsions which I have created and which have been successfully broken in the present invention include emulsions produced by effecting first a 500 gallon per hour flow rate by means of a high speed pump and then reducing this flow rate to 60 gallons per hour by means of a 2 inch Globe valve before it reaches the filter unit. In this manner water and oil emulsions were created which are undoubtedly more severe than those encountered in almost all known services. Test results indicate that the maximum effluent water content equals about 0.25% by volume. My test evaluations substantiate that the present mechanical filter separator is capable of exceeding the performance requirements for both water and solids removal of MIL–P–20632–A for turbine lubricating oil of the MIL–L–17731 type.

In tests which were conducted using the apparatus described, I added a 500 gallon per hour flow of water which brought the contamination level of water to oil to about 3% by volume. After running such contaminated material through the unit the sample became clear, indicating the removal of all undissolved water. In another test, I added to the fluid which was at 160° F. and flowing at 500 gallons per hour, a quantity of fine A.C. dust for about 100 minutes and weighing 4200 grams. The dust was weighed out in 10 equal increments of 420 grams each and was added as constantly as possible by hand over a ten minute period. An amount of water in the order of 2.0% by volume was added simultaneously and the contaminated fluid was then passaged through the apparatus and emerged completely clear. Tests were also run in which the contaminated fluid included 4.0% water and water in the amount of 33⅓% was likewise tested, and in each instance the effluent sample was clear and had no visible undissolved water contamination.

For some applications, I consider it desirable to replace the solenoid operated outlet valve 82 and electrodes 84, 86 with a float valve located within the sump chamber 36 which will lift upwardly when the water reaches an undesirable level to open the drain line from the chamber 36 until sufficient liquid contaminant has drained therefrom and the outlet is then closed. Either of these arrangements is acceptable to the present invention. One suitable fluid valve which is usable in the present invention is provided by Cla-Val Co. Alhambra, California, Cla-Val model No. 1626 and is a standard type automatic water discharge float mechanism consisting of a weighted ball float approximately 4 inches in diameter and attached to a float arm having a ported disc arrangement which rotates as the float moves up and down.

As a consequence of several tests employing the present apparatus, I have substantiated with a flow of 250 gallons per hour suitable filtering of liquid having as high as 50% water content and the effluent samples contain less than 0.30% water by volume. These tests substantiate that the present apparatus can equal or exceed the performance requirements which are specified for centrifugal purifiers in MIL-P-20632-A dated May 13, 1955, this being a military specification which sets forth the performance requirements for centrifugal purifiers. Therefore, the present mechanical separator is the equivalent of a centrifugal purifier and can be used in replacement thereof to provide a more economical, more reliable apparatus with no moving parts and no noise level, and one which is more desirable because of the lower *n*-power requirements and fewer service requirements.

Although the present invention has been illustrated and described in connection with selected example embodiments thereof, it will be appreciated that these are only illustrative and are in no sense restrictive thereof. It is reasonably to be presumed that those skilled in the art can make numerous revisions and adaptations of the invention to meet individual design requirements and it is intended that such changes which incorporate the herein disclosed principles will be included within the scope of the following claims as equivalents of the invention.

I claim:
1. A filter-separator for lubricating oil comprising, in combination:
   (a) a tank having an inlet line for the contaminated oil disposed in the upper portion of the tank and a water outlet line disposed in the lower end of the tank,
   (b) a first partition disposed in the upper portion of the tank forming with the tank an inlet chamber for receiving the contaminated oil,
   (c) a second partition disposed in the lower portion of the tank forming with the tank a second chamber and a third chamber,
   (d) filter means disposed in the second chamber and connected with the first chamber, said filter means adapted to coalesce the water in the oil and remove solid contaminant therefrom,
   (e) a canister surrounding said filter means and spaced with respect thereto,
   (f) said canister having a non-perforated shield disposed at each end and a perforated tube disposed between the two shields,
   (g) screen means having a hydrophobic surface covering said perforated tube, said screen means serving to direct the water in a downwardly direction while passing the oil therethrough,
   (h) said canister connected to the third chamber for directing the water thereto, and
   (i) two outlet lines connected to the second chamber for receiving the filtered oil which passes within said second chamber and located one at each end of said second chamber to effect a balanced radial flow throughout substantially the length of said filter means.

2. A filter-separator for lubricating oil comprising, in combination:
   (a) a tank having an inlet line for the contaminated oil disposed in the upper portion of the tank and a water outlet line disposed in the lower end of the tank,
   (b) a first partition disposed in the upper portion of the tank forming with the tank an inlet chamber for receiving the contaminated oil,
   (c) a second partition disposed in the lower portion of the tank forming with the tank a second chamber and a third chamber,
   (d) filter means disposed in the second chamber and connected with the first chamber, said filter means adapted to coalesce the water in the oil and remove solid contaminant therefrom,
   (e) screen means forming a water barrier in surrounding spaced relation with respect to said filter means, said screen means including an elongated non-perforated shield at each end,
   (f) means for collecting the water and directing it to the third chamber, and
   (g) two outlet lines connected to the second chamber for receiving the filtered oil which passes within said second chamber and located one at each end of said second chamber to effect a balanced radial flow throughout substantially the length of said filter means.

3. A filter-separator apparatus in accordance with claim 2 wherein the non-perforated shield is disposed adjacent the outlet lines to preclude carryover of coalesced water with the outlet flow of filtered oil.

4. A filter-separator apparatus in accordance with claim 1 including means for effecting subatmospheric pressure within said third chamber to insure downward flow of coalesced water to said third chamber, and to insure a more uniform viscosity throughout the oil.

5. A filter-separator apparatus in accordance with claim 1 including electrical means disposed in said third chamber for operating a valve to discharge the water when it reaches a predetermined level.

References Cited by the Examiner

UNITED STATES PATENTS

| | | | |
|---|---|---|---|
| Re. 24,136 | 4/56 | Marvel | 210—323 X |
| 1,689,277 | 10/28 | Burns | 210—414 X |
| 2,657,808 | 11/53 | Mankin | 210—323 X |
| 2,724,508 | 11/55 | Luther | 210—433 X |
| 2,891,673 | 6/59 | Zievers | 210—323 |
| 3,048,275 | 8/62 | Headrick | 210—307 X |

REUBEN FRIEDMAN, *Primary Examiner.*

HERBERT L. MARTIN, *Examiner.*